United States Patent Office 3,477,869

Patented Nov. 11, 1969

1

3,477,869

PROTECTIVE COATING

John Mann Butler, Dayton, and Clayton E. Hathaway, Jr., Kettering, Ohio, assignors to Monsanto Research Corporation, St. Louis, Mo., a corporation of Delaware No Drawing. Filed Dec. 21, 1965, Ser. No. 515,466
Int. Cl. B44d *1/34;* C04d *3/82, 3/84*
U.S. Cl. 117—72 10 Claims

ABSTRACT OF THE DISCLOSURE

An in situ formed coating prepared by curing a mixture of a silicone polymer and titanium dioxide at 370–550° C. on a solid metallic substrate.

This invention relates to coated materials which are serviceable at elevated temperatures and more particularly provides a new and valuable heat-resistant protective coating and the method of preparing the same.

In the manufacture of modern aircraft there is need for tough finishes having extraordinary heat stability and tenacious adherence to surface such as those presented by metal sheetings and glass. Generally, coatings having an organic polymer base do not possess the desired thermal properties, even when there are employed such expedients as hardening in the presence of cross-linking agents and/or introducing an inorganic moiety into the polymer structure. Although ceramic coatings are often employed on metals which require protection against oxidation at high temperatures, the preparation of such coatings requires firing temperatures which are generally much higher than those to which the coated article will need to be subjected during use.

An object of this invention is to provide a stable, fluid coating composition which can be applied to surfaces to form a film of substantial thickness which adheres tenaciously to the substrate, withstands elevated temperatures, and presents a tough, hard surface of pleasing appearance. Another object is the provision of thermally stable protective coating for metals. Still another object is the provision of a liquid coating composition which dries and adheres to the substrate at comparatively low temperatures and which can be converted to a tough, tenacious, thermally-resistant coating by subsequent heating.

These and other objects hereinafter defined are provided by the process which comprises substantially uniformly applying to the surface of a heat-resisting substrate a fluid composition consisting essentially of a mixture of a silicone polymer consisting essentially of groups represented by the formula:

$$(R)_xSiO_{(4-x)2}$$

in which R is selected from the class consisting of hydrogen and hydrocarbon radicals of from 1 to 8 carbon atoms and wherein no more than about 60% of the R radicals are hydrogen and $x$ is a number of from 1.0 to 1.80, an inert, organic, liquid solvent for said polymer, and finely comminuted titanium dioxide in a quantity which is from 250% to 1,000% by weight of the polymer, heating the composition at below about 370° C. for drying and curing, and subsequently heating the composition remaining to above about 370° C. and below about 550° C. to obtain upon the substrate a strongly adherent in situ formed coating.

2

More particularly, the invention provides the process of applying to a metal substrate a composition consisting essentially of titanium dioxide and the said silicone in a weight ratio of from 3:1 to 10:1 in an inert, volatilizable solvent for the silicone, allowing the composition to dry, curing the dried composition upon the substrate thereon by gradually heating at up to from 200° to 500° C. and then aging the composition upon the substrate by heating at from 500° C. to 550° C. to obtain upon the substrate a strongly adherent in situ formed coating which can be reheated to the aging temperature without substantial decomposition.

Silicones of the above formula are generally resinous materials which are soluble in alcohols and aliphatic and aromatic hydrocarbons and other volatilizable solvents which are commonly used in the coatings industry. Solutions of such silicones have been generally applied as coatings on metal surfaces to give adherent films. However, upon long exposure to high temperatures, i.e., temperatures in the range of 400–500° C., they undergo considerable decomposition. The aged film may continue to adhere, but it decreases in weight and hence in thickness, and may shrink sufficiently to cause cracking and flaking.

We have found that the usefulness of the above defined silicones for the manufacture of thermally resistant coatings is significantly increased by the presently provided process. A solution of the silicone is simply incorporated with the quantity of titanium dioxide set forth above; the resulting composition is applied to the substrate to be coated, e.g., by spraying, brushing, casting or trowelling; the solvent is volatilized off; and the dried composition is heated upon the substrate at above the temperatures which are generally used for curing the silicones.

The silicones with which the present invention is concerned are well known in the art; see, for example, Howard W. Post, "Silicones and Organic Silicon Compounds," Reinhold Publishing Co., New York, 1949; R. N. Meals and T. M. Lewis, "Silicones," Reinhold Publishing Co., New York, 1959; and R. R. McGregor "Silicones and Their Uses," McGraw-Hill Book Co., New York, 1954. Early description thereof are found in U.S. Patents Nos. 2,258,218–222 of Eugene G. Rochow. Thus in U.S. Patent 2,258,218, polymeric methyl silicone is stated to be a polymer having in its molecule an average of from approximately one to approximately two methyl groups for each silicon atom. In U.S. Patent No. 2,258,220, the ethyl-containing resin is stated to correspond to the formula $$(C_2H_5)_xSiO_{(4-x)2}$$

where x is a number between 0.5 and 1.5. In U.S. Patent No. 2,258,221, the aroxy silicones are stated to have the formula $R_2SiO$ where R is A—O—A' and A is aryl and A' is alkyl or aryl. In U.S. Patent No. 2,252,220, the silicone wherein one hydrocarbon radical is methyl and the other is aryl is stated to be a methyl aryl silicone or, specifically, methyl phenyl silicone.

Briefly, the silicon polymers are generally prepared by hydrolysis of a silicon compound of the formula $$R_xSiCl_{(4-x)}$$

where R is a hydrocarbon radical or hydrogen and where at least one R is hydrocarbon. The hydrolysis generally involves adding a solution of the silicon compound in an inert, organic liquid solvent to water, which may be at a temperature of from, say, about 5° C. to boiling, depending upon the nature of the individual silicon compound. The polymer, i.e., the silicone, generally precipitates out; however, if it is soluble in the solvent which has been used, it is readily obtained by removing the organic layer from the hydrolysis mixture and volatilizing off the solvent to leave the silicone as residue. Generally, the silicones are soft, rubbery materials rather than hard, resinous products. Hardening or "curing" of the silicones generally takes place upon heating them at up to temperatures which may be as high as 550° F. Higher temperatures usually degrade them. Although the hydrolysis of the chloro-silicon compounds to the silicones and curing of the latter proceeds generally without the use of catalysts or curing agents, in attempts to attain specifically desired characteristics, catalysts and curing additives are often employed. Although a variety of materials are known in the art to serve as catalysts and/or curing agents, basic agents are commonly used, e.g., non-ionic nitrogen bases, polyalkyleneamines, and compounds consisting of silicon and one or more amino radicals. Thus, in the Siegfried Nitzche Patent No. 3,032,528, (hydrocarbylamino) silanes are taught to be efficient curing agents for the silicones; in the Paul L. Brown Patent No. 3,170,894, compounds of the formula $O[Si(CH_3)_2(CH_2)_nNH_2]_2$ and $$[CH_3SiCH_2Si(CH_2)_n]_2CHNH_2$$

are taught to be catalysts for the co-condensation of silicones with silanes; and in the Ralph F. Sellers, U.S. Patent No. 3,068,199, aminoalkyl alkoxy silanes are used in the water hydrolysis of the chloro-silanes to the silicones.

Whether or not a catalyst and/or curing agent is used in the preparation and/or hardening of the silicones is immaterial insofar as obtaining the benefits conferred to coatings produced by heat treatment of silicones in admixture with titanium dioxide as provided by the invention.

When R in the $R_xSiO_{(4-x)2}$ formula of the presently useful silicones is hydrocarbon the silicones are generally prepared by the hydrolysis of halosilanes of the formula $RSiCl_3$, $R_2SiCl_2$ or $R_2SiCl$. Depending upon the nature of the halosilanes and the hydrolysis conditions, there are obtained either linear polymers, i.e., those in which the repeating unit is (I)

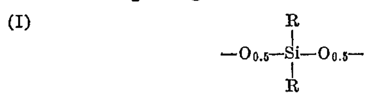

or polymers in which some or all of the above units are cross-linked at the silicon, thus (II)

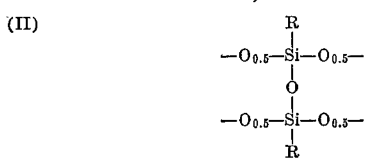

For coating purposes, polysilicones consisting of both units (I) and (II) are generally used. The entirely cross-linked silicones, i.e., those consisting of only unit (II) are generally too insoluble to be useful in such applications; however, the presence of some cross-linked units tends to increase thermal resistance. Accordingly, silicone resins which contain enough cross-linked units to exhibit improved thermal property, but insufficient to affect adversely the solubility property have been provided. Since the extent of cross-linking determines the properties of the silicone resins, the resin compositions are generally expressed by the type of formula used in the Rochow U.S. Patent No. 2,258,220 referred to above (see also the Paul L. Brown, U.S. Patents Nos. 3,122,522 and 3,170,894; the Edwin P. Pluedemann, U.S. Patent No. 3,046,250; the S. D. Brewer Patent 3,135,713 and the T. L. Talcott U.S. Patent No. 3,065,201), wherein the extent of cross-linking is indicated by the ratio of hydrocarbon to the number of oxygen atoms present, since the cross-linking, if any, is through that oxygen which is not present in a linear silicone. Thus, in the formula $R_xSiO_{(4-x)2}$ as $x$ increases, the average number of oxygen atoms decreases. Conversely, as the number of oxygen atoms increase, the number of hydrocarbon atoms decrease. When $x$ is 2, there is present one oxygen atom per hydrocarbon radical. This is the situation in a polymer consisting entirely of the linear unit (I). When $x$ is 1, there are present 1.5 oxygen atoms per hydrocarbon radical. This is the situation in a polymer consisting entirely of the cross-linked unit (II). In three-dimensional or other very highly cross-linked polymers, $x$ can be less than 1. Silicones wherein $x$ is a value between 1 and 2 generally consist of units (I) and (II), the ratio thereof being indicated by the proximity of the value to either unit. Thus, a silicone wherein the value of $x$ is 1.5, consists about 50 percent of each of the two units. One in which $x$ has a value of 1.75 consists about 80% of the linear unit (I) and 20% of the cross-linked unit (II).

For the present purpose, there are employed silicone resins wherein the value of $x$ is from 1 to 1.80. Silicones having a value for $x$ within this range are generally soluble in volatilizable solvents, and according to this invention solutions thereof can be incorporated with certain large quantities of titanium dioxide, applied to substrate, and heated upon the substrate at temperatures of up to 550° C. to form in situ, tightly bonded, highly heat-resistant coatings upon the substrate.

Also useful for the present purpose are silicone resins of the formula $R_xSiO_{(4-x)2}$ wherein up to 60% of the R radicals are hydrogen, with the remainder of the R radicals being hydrocarbon. The hydrogen-containing silicones are prepared in known manner by hydrolyzing a hydrocarbyltrichlorosilane or a mixture of a dichlorodihydrocarbylsilane and a silicon-halogen compound in which hydrogen is attached to silicon, e.g., a dichloromonohydrocarbylsilane or trichlorosilane, in the appropriate ratio to give a polysilicone in which some of the repeating units, but not more than commensurate with the above-stated 60 percent limitation, are:

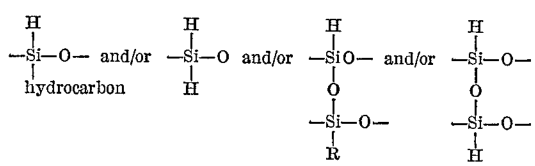

The hydrocarbyl radical in the silicones, whether or not they include one or all of the hydrogen-containing units shown above, may be any alkyl, alkenyl, cycloalkyl, aryl, alkaryl or aralkyl group which contains from 1 to 8 carbon atoms, e.g., it may be methyl, ethyl, vinyl, isopropyl, propyl, butyl, tert-butyl, pentyl, hexyl, heptyl, 2-ethylhexyl, octyl, cyclopentyl, cyclohexyl, dimethylcyclohexyl, phenyl, o-, m- or p-tolyl, o-, m- or p-ethylphenyl, xylyl, benzyl, 2-ethylphenyl, etc. The alkyl radicals need not be the same in the silicone molecule. As is shown in the art, halosilanes containing diverse hydrocarbyl radicals are readily hydrolyzed to give the silicone polymers, a readily available commercial silicone being that which is obtained by hydrolysis of dichloromethylphenylsilane to give a silicone including the unit:

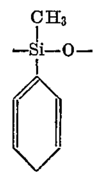

Also, as is well known in the art, silicones having a diversity of hydrocarbyl substituents are easily prepared by hydrolyzing a mixture of different hydrocarbon-substituted halo-silanes, e.g., a mixture of dichlorodiphenylsilane and dichlorodiethylsilane.

Although the commonly available silicones are those prepared from the dichlorodihydrocarbylsilanes, the invention also includes use of silicones prepared from other hydrocarbon-substituted halosilanes, e.g., the chlorotrihydrocarbylsilanes such as chlorotrimethylsilane or the hydrocarbyltrihalosilanes such as phenyltrichlorosilane, so long as the silicone product contains the hydrocarbon or hydrocarbon plus hydrogen relationship to oxygen content expressed in the formula $R_xSiO_{(4-x)2}$.

The presently provided, very heat-resistant coatings, are made by incorporating a solution of the silicone with the requisite quantity of the comminuted titanium dioxide, applying the resulting composition to the substrate, removing the solvent, and heating the residue to from 370° C. to 550° C. Incorporation of the silicone solution with the titanium dioxide may be effected simply by stirring. Advantageously, however, a high speed propeller mixer, a colloid mill or a ball mill is used. There is thus obtained a fluid mass containing particles of titanium dioxide substantially uniformly dispersed in the solution of the silicone.

The titanium dioxide may be derived from any of the naturally-occurring titania minerals, e.g., anatase, brookite or rutile. However, we have found that when color retention of the pigment is a vital consideration, pigment grade titanium/dioxide obtained from anatase is to be preferred. Yellowing as a result of the very high (about 1,000° F.) curing temperature is significantly less than that encountered with the same grade of titanium dioxide obtained from rutile. The solvent may be any inert, organic liquid which dissolves the polymer at ordinary room temperature or upon heating. Conveniently, the solvent may be that in which the silicone has been prepared.

Drying of the fluid composition upon the substrate may be done with or without heating, depending upon the ease of volatilization of the solvent. Generally, air-drying to set may be employed, particularly when evaporation of the solvent requires little, if any application of heat.

Although the curing step involves the use of temperatures at which oxidative attack may be expected, the atmosphere in which curing is conducted appears to be immaterial; i.e., it may be conducted in air or in an inert atmosphere which may be, e.g., nitrogen, argon or vacuum. Accordingly, in the more detailed examples which follow, curing was conducted in air. Advantageously the substrate, with the dried coating deposited thereon, is subjected, during a period of, say, from about one to five or six hours, to gradually increasing temperatures until a maximum of about 450° C. to 550° C. has been attained and heating is continued at the maximum temperature for a time of about a few minutes to several hours. This continued exposure to the maximum curing temperature will be hereinafter referred to as aging. A well cured and aged film will generally be smooth and glossy, adherent to the substrate, and hard enough to resist scratching with a sharp pencil. It will weight only a few percent less than it weighed before curing.

Evaluation of the cured coating may be conducted at the temperature and in the atmosphere which are to be encountered in the contemplated use of the cured, coated substrate. It is then inspected to determine the effect, if any, on adherence of the coating, its color, thickness and mechanical strength. Generally, aging in air at temperatures of up to 550° C. has substantially no effect on the appearance of the coating, the white color and the continuity, adherence and hardness of the film are substantially unchanged. However, in the presence of water, the aged, white coating may develop brown spots, particularly when it is present on an iron-containing substrate and the coated article is immersed in water over a substantial period of time. Except for this spotting, which may essentially change the color of the whole coating, the coating remains otherwise unchanged, retaining its smoothness and tenacity. Because this color change is evidenced even with a substrate of stainless steel and because it is not accompanied by flaking or loss of bond-strength, it is believed that reaction between the coating and the stainless steel surface occurs, leading to loss of passivity. The discoloration of the white coating upon storage in the presence of water is believed to be due to a rust-forming reaction between the no longer passivated substrate and moisture. When color is unimportant, the discoloration is of no moment, since film integrity is not impaired.

According to the major embodiment of this invention, a moisture-resistant, white coating is obtained by first priming the substrate with an aluminum-containing silicone coating and then applying the titanium oxide-containing silicone coating as the finish coat. The primer coating is prepared by dispersing finely comminuted aluminum, e.g., a pigment grade or flake aluminum into a solution of the silicone resin, employing a quantity of aluminum which may be considerably less than the quantity of titanium oxide used for preparing the top coating or which may be of about the same order. The silicone resins and the solvents therefor which are useful for preparing the dispersions of aluminum are generally those which are useful for preparing the presently useful dispersions of titanium oxide; but the concentration of powdered or flanked aluminum which is used may be as low as, say 10% by weight of the resin. Usually a dispersion containing from 10% to 100% by weight of the aluminum provides primer coatings for metal substrate which serve to prevent discoloration of the titanium oxide-containing coating in the presence of water. Such primer coatings adhere to the substrate and provide a base for the top coat to which the titanium oxide coating is tenaciously bonded.

In providing the two coats, preferably the primer dispersion is applied to the substrate, the solvent is allowed to evaporate, e.g., by air-drying, and the top-coat of titanium oxide dispersion is applied to the dry primer coating. After the top coat has dried, curing of both coats may be conducted simultaneously by heating to above 370° C. and below 550° C. Preferably, however, the individual coats may be cured separately, the dry primer coating being heated at temperatures of up to 550° C. before applying the titanium oxide-containing top coat. Both coats are then heated at from 370–550° C.

The invention is further illustrated by, but not limited to, the following examples.

EXAMPLE 1

A commercially obtained xyene solution of a silicone resin having a solid content of 50 weight percent, and a viscosity of 100–200 cps. at 25° C. was used in this example. The resin contained phenyl and methyl radicals as hydrocarbon substituents at the silicon atom and conformed to the formula $R_xSiO_{(4-x)2}$ where $x$ is between 1 and 2. This resin cross-links upon curing. It has a high hydrocarbon-silicon ratio. The effect of titanium dioxide concentration on coatings obtained from this solution was studied as follows:

Respective dispersions were prepared, using 2.0 g. of the said resin solution, 4.0 g. (5.72 g. for formulation IV, below) of xylene, 4 drops of a conventional aminosilane catalyst [$NH_2CH_2CH_2NHCH_2CH_2CH_2Si(OCH_3)_3$], and the amount of pigment grade titanium dioxide shown below. Dispersing was conducted by grinding in a ball mill. Substrate strips of stainless steel were cleaned by scouring and rinsing with distilled water and then oven dried. The dispersions were respectively cast onto the cleaned strips using a 3 mil. gauge micro doctor knife. After air-drying, the strips with their deposits were cured at 90° C., 140° C. and 200° C., employing successive heating periods of 4 hours at each of these temperatures. The strips were examined and weighed before and after curing and after aging for 8 hours in air at 538° C. The following results were obtained, the indicated weight losses and pigment concentrations being calculated on the basis of the respective films, alone, rather than on film plus substrate.

| $TiO_2$ in the dispersion, g. | Curing wt. loss, percent | After Aging: Film integrity | Film adhesion | Weight loss percent | Conc. of $TiO_2$, percent |
|---|---|---|---|---|---|
| 1.27 | 2 | Flaky | Almost none. | 27 | 70 |
| 2.93 | 1 | Good | Good | 13 | 87 |
| 4.60 | 1 | do | do | 10 | 92 |
| 9.60 | 1 | do | do | 5 | 96 |

In the first of the above formulations, the proportions of silicone to pigment in the dispersion was 1:1.27, since at 50% solids the 2.0 g. of resin solution contained only 1 g. of silicone. The pigment was thus present in a quantity which was 127% of the silicone. At this concentration, aging caused a very high loss in weight of the film and this was evidenced by the flaky nature of the film and very little, if any, adhesion to the substrate. Note also, that curing caused twice the weight loss of that undergone by films from other formulations. With the range of 293 to 960% of titanium dioxide, based on silicone, significant improvements were obtained. The films, white and hard, had an unbroken, shell-like surface. They adhered tightly to the steel substrate. Noteworthy, also was the behavior in hardness which was demonstrated with increasing concentration; after aging, the film from the 2.93 g. of $TiO_2$ formulation had a pencil hardness of 4H and that of the film from the 4.60 g. $TiO_2$ formulation had 3H. The aged film from the 9.60 g. $TiO_2$ formulation was less hard, having a hardness of 1H. In spite of the 96% $TiO_2$ concentration in the aged coating there was still demonstrated tight adhesion, a continuous surface and an eggshell lustre.

EXAMPLE 2

This example shows preparations of a coating from the commercial silicone solution of Example 1 in absence of the aminosilane catalyst which was used in that example.

A dispersion was prepared from 2.0 g. of the silicone solution, 4 g. of xylene and 4.5 g. of pigment grade titanium dioxide. The dispersion was cast onto two clean stainless steel strips, using a 3 mil gauge doctor knife for one strip (strip 1) and a 10 mil knife for the other (strip 2), and air dried at room temperature and then overnight at 90° C., and cured four hours each at 140° and 200° C. Each of the strips was weighed before and after curing to determine any weight loss resulting from the curing and the thickness of the coating film after curing was determined. The cured coatings were then tested for thermal and oxidative stability by maintaining the coated strips in air at 538° C. for 8 hours. They were then weighed and the film thickness remeasured. The following results were obtained:

| | After Curing: Wt. Loss, percent | Film Thickness, mils | After heating at 538° C.: Wt. Loss, percent | Film thickness, mils |
|---|---|---|---|---|
| Strip 1 | 1.0 | 0.6–1.1 | 9.5 | 0.6–1.1 |
| Strip 2 | 1.0 | 2.5–3.2 | 10.0 | 2.5–3.2 |

Assuming that the weight loss was due entirely to loss of resin, the coating, after the thermal stability test, consisted of 91% of pigment. The appearance of the coating after this test was good. It had an eggshell gloss, was white in color, and could be scratched only by a pencil hardness of 2H in case of strip 1 and of 3H in case of strip 2. There was no evidence of flaking, and the coating film adhered tightly to the steel substrate.

EXAMPLE 3

A cross-linked copolymer, consisting of the unit

```
   CH3
   |
 —Si—O
   |
   CH3
```

and the unit

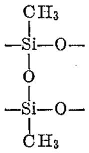

was used as the resinous component in this example. It was prepared by slowly adding a solution of 3.22 g. (0.025 mole) of dimethyldichlorosilane and 7.84 g. (0.050 mole) of methyltrichlorosilane in 42.5 ml. of ether to ice water, extracting the resulting silicone with ether, and removing ether from the extract to obtain the polymer as residue. The polymer was dispersed with titanium dioxide in ethanol, using the following quantities of these materials for two different formulations:

| | Polymer, g. | $TiO_2$ Weight: Grams | Percent of Polymer |
|---|---|---|---|
| Formulation: | | | |
| (A) | 0.80 | 1.20 | 150 |
| (B) | 0.58 | 2.00 | 343 |
| (B) | 0.58 | 2.00 | 343 |

For formulation (A), there was employed 3.20 g. of ethanol; 5.30 g. was used for (B).

The dispersions were applied to the cleaned, stainless strips described in Example 1, using a 10 mil micro doctor knife. After air-drying, curing was effected at 90°, 140° and 200° C. in successive 4-hour periods at each temperature. Aging of the cured strips was conducted in air at 538° C. for 8 hours. The following results were obtained:

| | Curing Loss, wt. Percent | After Aging: Film Integrity | Weight Loss, Percent | Concn. of $TiO_2$, Percent |
|---|---|---|---|---|
| Film from— | | | | |
| (A) | 7 | Pinholed | 6 | 69 |
| (B) | 1 | Good | 1 | 80 |

The holes in the film obtained from (A) detract not only from its appearance but also adversely affect its protective property. The coating was extremely hard (9H). The coating obtained from (B) was a white, continuous, tightly adherent film of good appearance. It was also extremely hard (7H). The very low weight loss in the film from (B), both upon curing and aging, is significant.

EXAMPLE 4

A mixture consisting of 0.80 g. of hydrogen-containing silicone, obtained by hydrolyzing a solution of 13.5 g. (0.105 mole) of dimethyldichlorosilane and 28.7 g. (0.21 mole) of trichlorosilane in ether as described in Example 3, 2.88 g. of titanium dioxide (360% of polymer weight) and 3.20 g. of xylene was dispersed as described in Example 1 and the dispersion was applied, by means of a 3-mil micro doctor knife, to a cleaned stainless steel strip. Drying, curing and aging were conducted as in Example 3. Upon curing and upon aging there was a zero loss in weight in both cases. The aged film of coating was a continuous flat, white finish of good integrity.

EXAMPLE 5

A mixture of 0.60 g. of a silicone prepared by hydrolyzing in ice water an ether solution of 12.8 g. (0.1 mole) of dimethyldichlorosilane and 29.9 g. (0.2 mole) of methyltrichlorosilane and having a C/Si ratio of 1.33, 4.35 of titanium dioxide and 3.60 g. of xylene was ground in a ball mill to a dispersion, and the dispersion was applied to a clean stainless steel panel by using a 3-mil micro doctor knife. Air drying, curing and aging as in Example 3 gave a white coating of 1.2 to 1.9 mil thickness having an eggshell gloss, and very good integrity and adhesion. A 0.0% loss in weight upon curing and a 1.0% loss upon aging were determined.

EXAMPLE 6

A silicone was prepared by hydrolyzing a solution of 29.9 g. (0.2 mole) of methyltrichlorosilane in 100 ml. of ether in ice-water. The silicone, which had a hydrocarbon/silicon ratio of 1.06 was incorporated with titanium dioxide pigment by dispersing 0.80 g. of the silicone with 2.60 g. (325% of the silicone) of the pigment in 3.20 g. of ethanol. Application of the dispersion to a clean stainless steel strip was made using a 3-mil micro doctor knife. The coated strip was air-dried, cured at 90°, 140° and 200° C. for successive 4-hour periods at each temperature and then aged in air at 538° C. for 8 hours. There was a 3% loss in weight during curing and 0.0% loss during aging. The aged coating, which consisted of 79% of pigment, was of good appearance and so hard that it could not be scratched with a pencil softer than one of 9H hardness.

EXAMPLE 7

The commercial solution of methyl phenyl silicone described in Example 1 was made into respective dispersions by grinding 2.00 g. of the solution (having a silicone content of 50% by weight) with either 2.20 g. of a pigment grade of anatase titanium dioxide or with 2.20 g. of a pigment grade of rutile titanium dioxide, using in each case 4.0 g. of xylene as diluent and 4 drops of the amino-silane catalyst described in Example 1. The respective dispersions were cast on clean, stainless steel strips by means of a 3-mil micro doctor knife, cured at 90°, 140° and 200° C. during successive 4-hour periods at each temperature, and aged at 538° C. for 4 hours. Inspection of the aged coatings at 538° C. showed a noteworthy difference in the appearance of the coatings on the two strips, the rutile-containing coating being much less white than the other. Upon cooling to room temperature, the anatase coating was white, had a flat finish, and was of 4H pencil hardness, whereas the white coating obtained with the rutile pigment had an eggshell finish, and was of a 2H pencil hardness.

EXAMPLE 8

An aluminum-containing dispersion was prepared by grinding in the ball mill a mixture consisting of 0.1 g. of finely powdered, pigment-grade aluminum, 1.0 ml. of the commercial resin solution described in Example 1, and 4.0 ml. of xylene. After mixing the dispersion with 2 drops of the amine catalyst described in Example 1, a portion of it was cast onto about one half of the surface of a clean panel of stainless steel, using a 3 mil gauge micro doctor knife. It was then allowed to air-dry at 90° C.

A titanium oxide-containing dispersion was prepared by grinding a mixture consisting of 1.92 g. of pigment grade titanium dioxide, 2.0 g. of the same resin solution and 4.0 g. of xylene. It was mixed with 4 drops of the same amine catalyst.

A portion of the titanium oxide-containing dispersion was cast (3 mil knife) on that half of the air-dried panel which had not been coated with the aluminum-containing dispersion, so that the two coatings abutted. Another portion of the titanium oxide-containing dispersion was employed to stripe a part of the surface which had been coated with the aluminum-containing dispersion. The total surface of the test panel was thus coated in three different ways: (1) a single coat of the aluminium-containing dispersion, (2) a single coat of the titanium oxide dispersion and (3) a primer coat of the aluminum-containing dispersion plus a top coat of the titanium oxide dispersion. After air-drying, the panel was submitted to a temperature of 538° C. for 8 hours. At the end of that time the aluminum-containing coating was gray, and the titanium oxide-containing coating, whether directly on the steel or on the aluminum coating, was white.

Evaluation of the thus-aged, coated panel was conducted by maintaining the panel immersed in water for about 4 months under ambient conditions. At the end of that time, the single coating of the aluminum dispersion was blistered, and the single coating of the titanium oxide dispersion had turned brown. On the other hand the striped portion, which consisted of both coatings, was white, hard and smooth. There was no evidence of bonding failure. Use of the aluminum-containing dispersion thus inhibits any color-forming reaction between the steel substrate and the titanium oxide-containing coating.

Although the above examples are limited to only stainless steel as the substrate, the invention is applicable to the coating of metals generally, e.g., iron and the various alloys thereof, manganese, aluminum, chromium, copper, beryllium, cobalt, titanium and heavy metals, generally. The presently provided coating process is likewise suitable for the provision of tough and adherent, thermally stable, protective coatings for siliceous material, including the ceramics and glasses and for carbonaceous materials such as graphite.

It is to be understood that although the invention has been described with specific reference to particular embodiments thereof, it is not to be so limited, since obvious changes and alterations therein may be made which are within the full intended scope of this invention as defined by the appended claims.

We claim:

1. An in situ formed coating prepared by substantially uniformly applying to the surface of a solid metallic substrate a fluid composition consisting essentially of a mixture of a silicone polymer consisting essentially of groups represented by the formula $$(R)_xSiO_{(4-x)2}$$

in which R is selected from the class consisting of hydrogen and hydrocarbon radicals of from 1 to 8 carbon atoms and wherein no more than about 60% of the R radicals are hydrogen and $x$ is a number of from 1.0 to 1.80, an inert, organic, liquid solvent for said polymer, and finely comminuted titanium dioxide in a quantity which is from 250% to 1000% by weight of the polymer, heating the composition at below about 370° C. for drying and curing, and subsequently heating the composition remaining to above about 370° C. and below about 550° C. to obtain upon the substrate a strongly adherent in situ formed coating.

2. The coating defined in claim 1, further limited in that R is hydrocarbon.

3. The coating defined in claim 1, further limited in that R is alkyl.

4. The coating defined in claim 1, further limited in that R is methyl.

5. The coating defined in claim 1, further limited in that up to 60% of the R substituents are hydrogen, with the remaining being methyl.

6. The coating defined in claim 1, further limited in that the R substituents are methyl and phenyl.

7. The coating defined in claim 1, further limited in that subsequent to evaporating the diluent, the composition is cured by gradually heating to about 500° C. and then aged by heating at 500° C.–550° C.

8. The coating defined in claim 1, further limited in that the titanium dioxide is derived from anatase.

9. The coating defined in claim 1, further limited in that the substrate is stainless steel.

10. An in situ formed coating prepared by substantially uniformly applying to the surface of a refractory substrate a fluid composition consisting essentially of a mixture of a silicone polymer consisting essentially of groups represented by the formula $$(R)_xSiO_{(4-x)2}$$

in which R is selected from the class consisting of hydrogen and hydrocarbon radicals of from 1 to 8 carbon atoms and wherein no more than about 60% of the R radicals are hydrogen and $x$ is a number of from 1.0 to 1.80, an inert, organic, liquid solvent for said polymer, and finely comminuted aluminum in a quantity which is from 10% to 100% by weight of the polymer, evaporating of said solvent to give a primer coating on the substrate and then uniformly applying on the primer surface a second fluid composition consisting of said silicone polymer and said solvent and titanium dioxide in a quantity which is from 250% to 1000% by weight of the polymer, evaporating off said solvent from the second composition, and heating the compositions remaining to above 370° C. to obtain upon the substrate a strongly adherent in situ formed coating.

References Cited

UNITED STATES PATENTS

| | | | |
|---|---|---|---|
| 2,619,443 | 11/1952 | Robinson | 117—221 X |
| 3,364,065 | 1/1968 | Cutright | 117—161 X |

RALPH S. KENDALL, Primary Examiner

U.S. Cl. X.R.

117—75, 123, 124, 132, 137, 161; 260—37